US008301506B2

(12) United States Patent
Tan et al.

(10) Patent No.: US 8,301,506 B2
(45) Date of Patent: Oct. 30, 2012

(54) METHOD AND SYSTEM FOR MANAGING CATEGORIES OF AN ELECTRONIC COMMERCE WEBSITE

(75) Inventors: Yingliang Tan, Hangzhou (CN); Tianbao Lin, Hangzhou (CN); Ya Lin, Hangzhou (CN); Minxu Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 323 days.

(21) Appl. No.: 12/592,216

(22) Filed: Nov. 19, 2009

(65) Prior Publication Data

US 2010/0131338 A1     May 27, 2010

(30) Foreign Application Priority Data

Nov. 25, 2008  (CN) .......................... 2008 1 0179026

(51) Int. Cl.
*G06Q 30/00*      (2006.01)
*G06F 17/30*      (2006.01)
(52) U.S. Cl. ..................... 705/26.1; 705/26.61; 705/27.1
(58) Field of Classification Search ......... 705/26.1–27.2
See application file for complete search history.

(56) References Cited

U.S. PATENT DOCUMENTS

| | | | |
|---|---|---|---|
| 6,792,422 B1* | 9/2004 | Stride et al. .................. | 707/693 |
| 2002/0016798 A1* | 2/2002 | Sakai et al. .................. | 707/517 |
| 2002/0019763 A1* | 2/2002 | Linden et al. .................. | 705/10 |
| 2006/0059157 A1* | 3/2006 | Heusermann et al. .......... | 707/10 |
| 2006/0178918 A1 | 8/2006 | Mikurak | |
| 2006/0212361 A1 | 9/2006 | Perkowski | |
| 2006/0235764 A1 | 10/2006 | Bamborough et al. | |
| 2007/0150365 A1* | 6/2007 | Bolivar .......................... | 705/26 |
| 2007/0150387 A1 | 6/2007 | Seubert et al. | |
| 2008/0250026 A1* | 10/2008 | Linden et al. .................. | 707/10 |
| 2008/0301042 A1* | 12/2008 | Patzer ............................. | 705/39 |
| 2009/0100093 A1* | 4/2009 | Makipaa ..................... | 707/104.1 |
| 2009/0132345 A1* | 5/2009 | Meyssami et al. .............. | 705/10 |
| 2009/0132508 A1* | 5/2009 | Skowronek ....................... | 707/4 |
| 2009/0240605 A1* | 9/2009 | Rukonic et al. ................. | 705/30 |
| 2009/0248486 A1* | 10/2009 | Gupta et al. .................... | 705/10 |
| 2009/0265251 A1* | 10/2009 | Dunlap et al. .................. | 705/26 |

OTHER PUBLICATIONS

"How to Submit Your eBay Store to Search Engines, Google," eBay Guides, Nov. 26, 2007.*

* cited by examiner

*Primary Examiner* — Will Allen
*Assistant Examiner* — Kathleen G Palavecino
(74) *Attorney, Agent, or Firm* — Van Pelt, Yi & James LLP

(57) ABSTRACT

Managing categories in an electronic commerce system, includes obtaining transaction information pertaining to a set of back-end categories, the transaction information includes user information of users in the system who completed transactions in the set of back-end categories during a preset period, determining, based on the user information, a set of front-end categories that were selected by users in the system during the preset period, determining number of times a front-end category in the set of front-end categories was selected by the users in the system during the preset period, and adjusting the front-end category according to the transaction information and the number of times the front-end category was selected during the preset period.

23 Claims, 5 Drawing Sheets

METHOD AND SYSTEM FOR MANAGING CATEGORIES OF AN ELECTRONIC COMMERCE WEBSITE

This application claims priority to the People's Republic of China Patent Application No. 200810179026.1 entitled METHOD AND DEVICE FOR ADJUSTING THE FRONT-END CATEGORY OF AN ELECTRONIC COMMERCE WEBSITE filed on Nov. 25, 2008 which is incorporated herein by reference for all purposes.

FIELD OF THE INVENTION

The present invention relates to the field of electronic commerce, and in particular, to a method and a device for managing product categories in an electronic commerce website.

BACKGROUND OF THE INVENTION

Presently, an electronic commerce website can include front-end categories and back-end categories. The back-end categories or back-end product or service categories refer to a hierarchical product or service category relation, often recorded in the transaction flow of an electronic commerce website and used in the back-end for transaction accounting. For example, a hierarchical product back-end category may include an upper-level back-end category "mobile phone", which in turn may include lower-level back-end categories such as "Nokia mobile phone", "domestic mobile phone" and "Samsung mobile phone". The back-end category is often relatively stable and adjusted infrequently.

Front-end category or front-end product or service category refers to a hierarchical product or service category relation exhibited or presented on a product presentation page of an electronic commerce website for viewing by users, and it is used to guide web page presentation to users. Usually, a front-end category may include or otherwise be associated to one or more back-end categories and may be frequently adjusted by a website administrator, so it is often flexible. For example, the back-end categories "Nokia mobile phone", "domestic mobile phone" and "Samsung mobile phone", etc. may be associated to the front-end category "hot mobile phone", and a user may be linked to a corresponding product page via the front-end category "hot mobile phone".

Presently, electronic commerce website administrator typically can only easily see the overall transaction events of an electronic commerce web site and the overall transaction events of individual products. The administrator in general cannot conveniently know which front-end category through which the users browse the product information that ultimately leads to the purchase transaction. An administrator therefore cannot conveniently know whether the design of the front-end category such as the organizational structure of the front-end category is reasonable and whether each product is well presented to users. An effective product representation is important for increasing product turnover.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
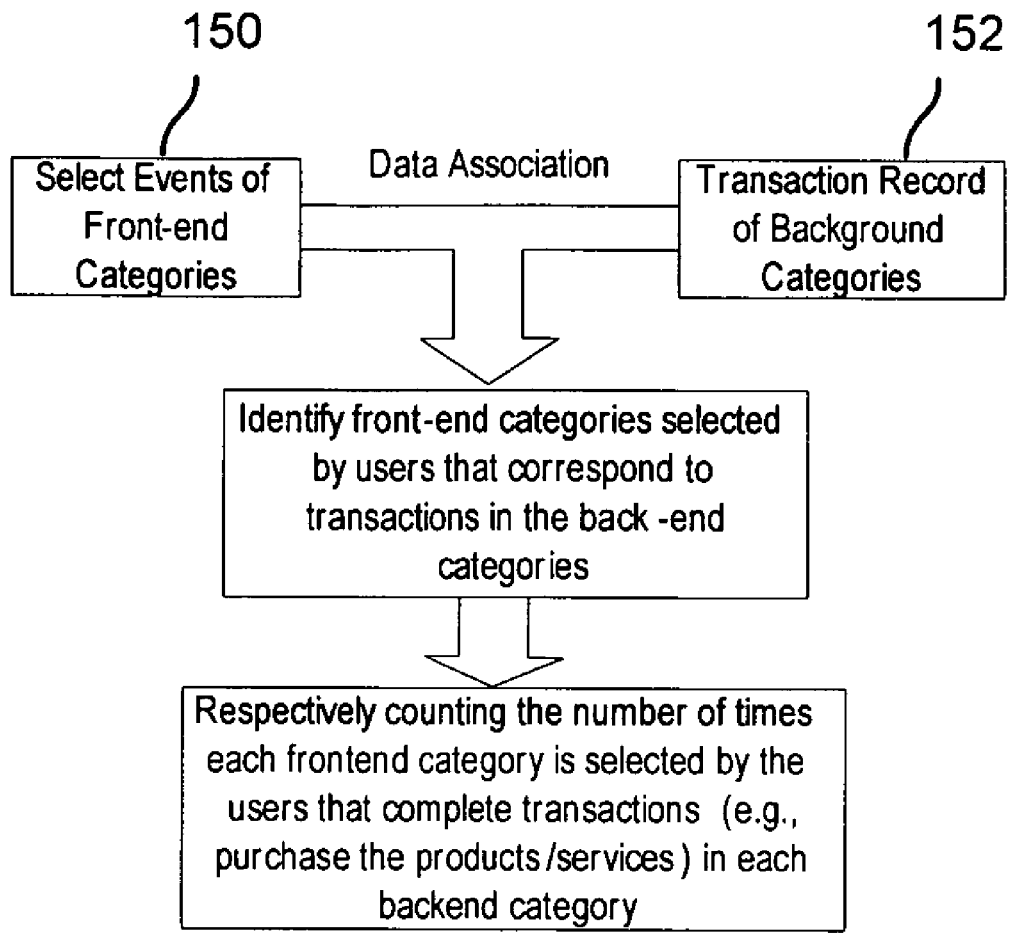
FIG. 1 is a data flow diagram illustrating an embodiment of a process for managing product categories of an electronic commerce website.

FIG. 1 is a data flow diagram illustrating an embodiment of a process for managing product categories of an electronic commerce website. User selection events that occur in the front-end of the website 150 (e.g., click events indicating that certain front-end categories have been clicked by the user) and transaction records of background categories 152 are associated. Each back-end category corresponds to one type of product, e.g., "Nokia mobile phone". A transaction record indicates a transaction that has taken place on the type of product. Examples of transactions include a purchase, the user's viewing of the selected product, the user's storing of the selected product for later purchase, or other appropriate action that informs website operators of users' interests in the products. The data in 150 and 152 may be mapped using pointers or references, combined into each other, or otherwise associated such that a correspondence between the selection of a front-end category and the transaction in the back-end category is established. The associated data is used to look up the front-end categories selected by users that correspond to transacted item in the back-end categories. For each front-end category that corresponds to a purchased back-end category, the number of times the front-end category is selected by the users is counted to determine the degree of influence (e.g., conversion rate) of the number of selections on the front-end category has on the product transactions in the back-end category.

Figure 2:
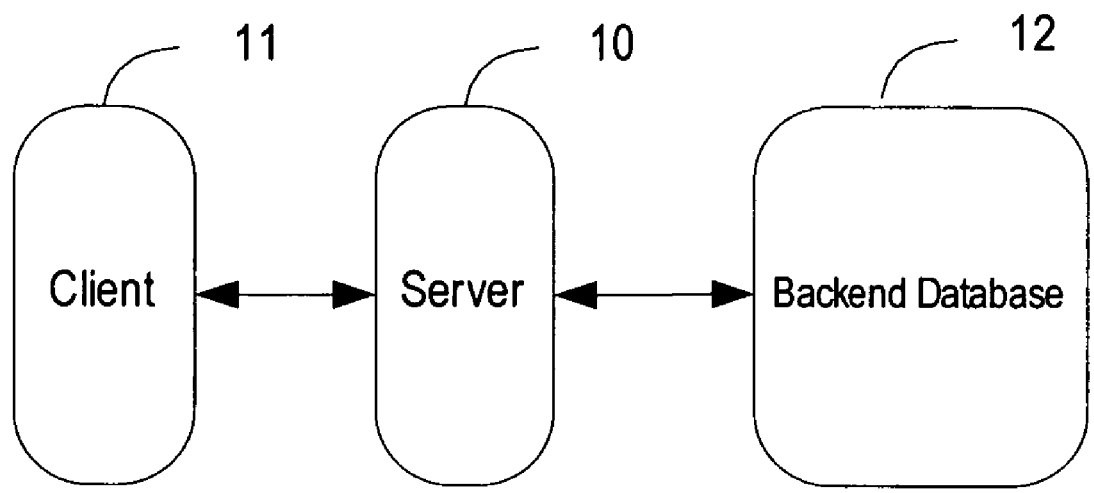
FIG. 2 is a block diagram of an embodiment of a system configured to manage product categories of an electronic commerce website.

FIG. 2 is a block diagram of an embodiment of a system configured to adjust the front-end category of an electronic commerce website. In the example shown, the system includes a client of electronic commerce website client 11, a server 10 and a back-end database 12. In some embodiments, the back-end database 12 is included in the server 10 or operates on an independent server. The client 11 captures user select events (e.g., click event) and delivers the captured user events to the server 10. The back-end database 12 records transaction events of products in the back-end category. The association between the selection events of front-end categories and the transaction events of products in the back-end categories of an electronic commerce website is realized via the server. Where, each front-end category includes or is otherwise associated with at least one back-end category, and each back-end category belongs to or is otherwise associated with at least one front-end category.

In some embodiments, a front-end category list and a back-end category list are respectively stored in the server. A mapping relation is established between the front-end categories and the back-end categories, that is, a mapping relation is established between each back-end category and the front-end category to which it belongs. By establishing a mapping relation, the back-end categories and their associated information may be accessed when their corresponding front-end category is selected (e.g., clicked).

For example, front-end category "hot mobile phone" may include back-end categories "Nokia mobile phone", "Samsung mobile phone" and "domestic mobile phone", etc., that is, a mapping relation is established between the front-end category "hot mobile phone" and the back-end categories "Nokia mobile phone", "Samsung mobile phone" and "domestic mobile phone".

Front-end category "mobile phone in promotion" may include back-end categories "domestic mobile phone" and "Nokia mobile phone". Thus, a mapping relation is established between the front-end category "mobile phone in promotion", and the back-end categories "domestic mobile phone" and "Nokia mobile phone".

Front-end category "hot camera" may include back-end categories "Sony camera", "Kodak camera" and "Samsung camera". Thus, a mapping relation is established between the front-end category "hot camera" and the back-end categories "Sony camera", "Kodak camera" and "Samsung camera".

Front-end category "camera in promotion" may include back-end categories "Sony camera" and "Samsung camera". Thus, a mapping relation is established between the front-end category "camera in promotion", and the back-end categories "Sony camera" and "Samsung camera".

Figure 3:
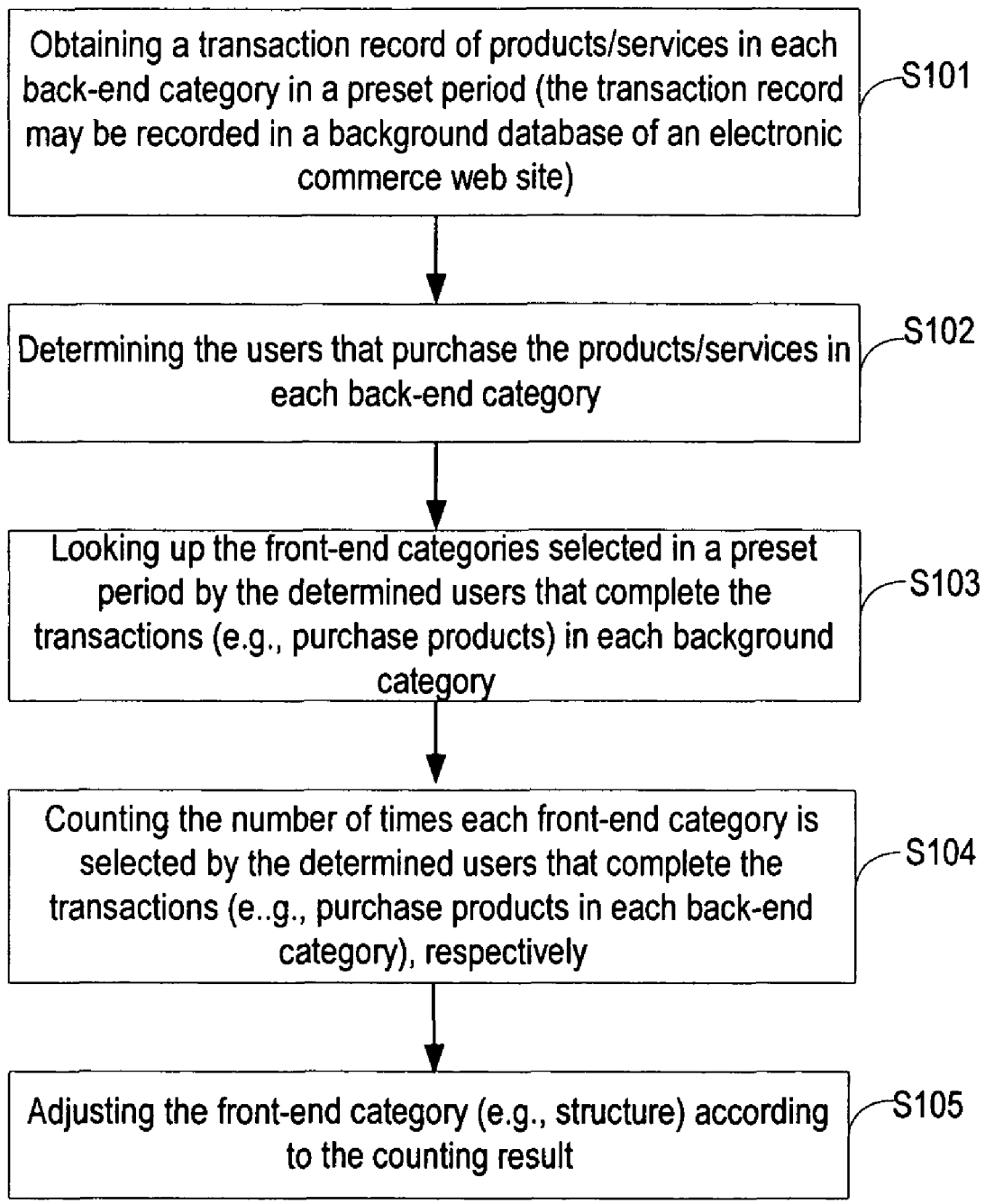
FIG. 3 is a flow chart illustrating an embodiment of a process for adjusting the front-end category of an electronic commerce website.

FIG. 3 is a flow chart illustrating an embodiment of a process for adjusting the front-end category of an electronic commerce website. The process may be performed on a web server or a database server, and includes the following:

At S101, obtaining a transaction record for products in each back-end category. The transaction record records transactions done to the products in the back-end category during in a preset period. Examples of transactions include purchasing the product, viewing the product, saving the product in a shopping cart or wish list, etc. In some embodiments, the transaction records (e.g., purchase records, viewing records, saving records, etc.) of products in each back-end category are saved in a back-end database of the electronic commerce website, and each record at least includes the back-end category to which the transacted product belongs, the user information such as identifiers (IDs) of the users that completed transactions with respect to the product.

At S102, determining the users that transacted the products in each back-end category. Because the transaction record contains user information such as user ID, the users that purchase the products in each back-end category can be readily determined.

At S103, the front-end categories selected during a preset period by the users that transacted products in each back-end category are determined. This step includes the following two actions:

1) Determining the front-end categories selected in the preset period by the users that purchase the products in each back-end category, by matching the selection event record of all users on each front-end category in the preset period that is recorded by the front-end log system using the user ID. In some embodiments, this action specifically includes, in no particular order:

i) Obtaining the selection event record of all users who selected the front-end category in the preset period. In some embodiments, the selection event record is recorded by the log system of the electronic commerce website. The log system of the electronic commerce website may record the selection event of each front-end category by the users. The selection event record at least includes the user ID of the user that selected each front-end category.

iii) Determining the front-end categories selected during the preset period by the users that transacted the products in each back-end category according to the user ID determined and the selection event record obtained.

2) Recording the front-end category that is selected by the user when the user completes a transaction on a product in the back-end category. In some embodiments, the front-end category selected when the user who transacted the product is recorded according to the access path of the user that is recorded in the address bar of the electronic commerce website.

At S104, the number of times each front-end category was selected by the users that transacted products in each back-end category is determined. For example, the number of times front-end category A1 is selected by the users that purchase products in each back-end category is counted as x1; the number of times front-end category A2 is selected by the users that purchased products in each back-end category is counted as x2; and the number of times front-end category A3 is selected by the users that purchase products in each back-end category is counted as x3, etc.

At S105, the front-end category structure according to the counting result is adjusted. The influence of each front-end category on the product transaction in the back-end category is analyzed according to the counting result, the organization structure of the front-end category is redefined and adjusted according to the analysis result, and an optimized front-end category organization structure is obtained.

The readjustment of the organization structure of the front-end category may include: increasing or reducing the front-end categories, and increasing or reducing the back-end categories associated with the existing front-end categories, etc.

For example, when the number of selections of a certain front-end category is large and the turnover of products in the corresponding back-end categories is high, additional related back-end categories may be added to correspond to the front-end category so as to increase the turnover of products in other back-end categories. In other words, a mapping between the additional back-end categories and the front-end category is established. For example, when a large number of users click on the front-end category "hot mobile phone", additional back-end categories such as "mobile phone with email capability" are added to map to "hot mobile phone".

When the number of selections to a certain front-end category is small and the turnover of products in the back-end categories contained is low, some of the back-end categories contained may be deleted, and the deleted back-end categories are added into other front-end categories so as to increase the turnover thereof. The deletion of the back-end categories contained in the front-end category accomplished by cancelling the mapping relationship between the back-end and front-end categories.

When the number of selection of a certain front-end category used by a certain category of products is large and the turnover of products in the back-end categories contained is high, certain corresponding front-end category may be added for other categories of products by referring to this front-end category. For example, when the number of click times of front-end category "hot mobile phone" is large and the turnover of products in the mobile phone-type back-end categories contained is great, the corresponding front-end category, such as "hot notebook computer", may be added to the corresponding front-end category of other categories of products, such as notebook computer-type product, by referring to this mode.

After the reorganizing the front-end category structure according to the counting result, a verification process may also be included for verifying whether turnover was increased as a result of the improved front-end category organization structure.

The total turnover of products in the electronic commerce website in the next preset period is counted, and it is verified via the counted total turnover whether the reorganized front-end category structure gets a good exhibition effect and whether the turnover is increased.

Figure 4:
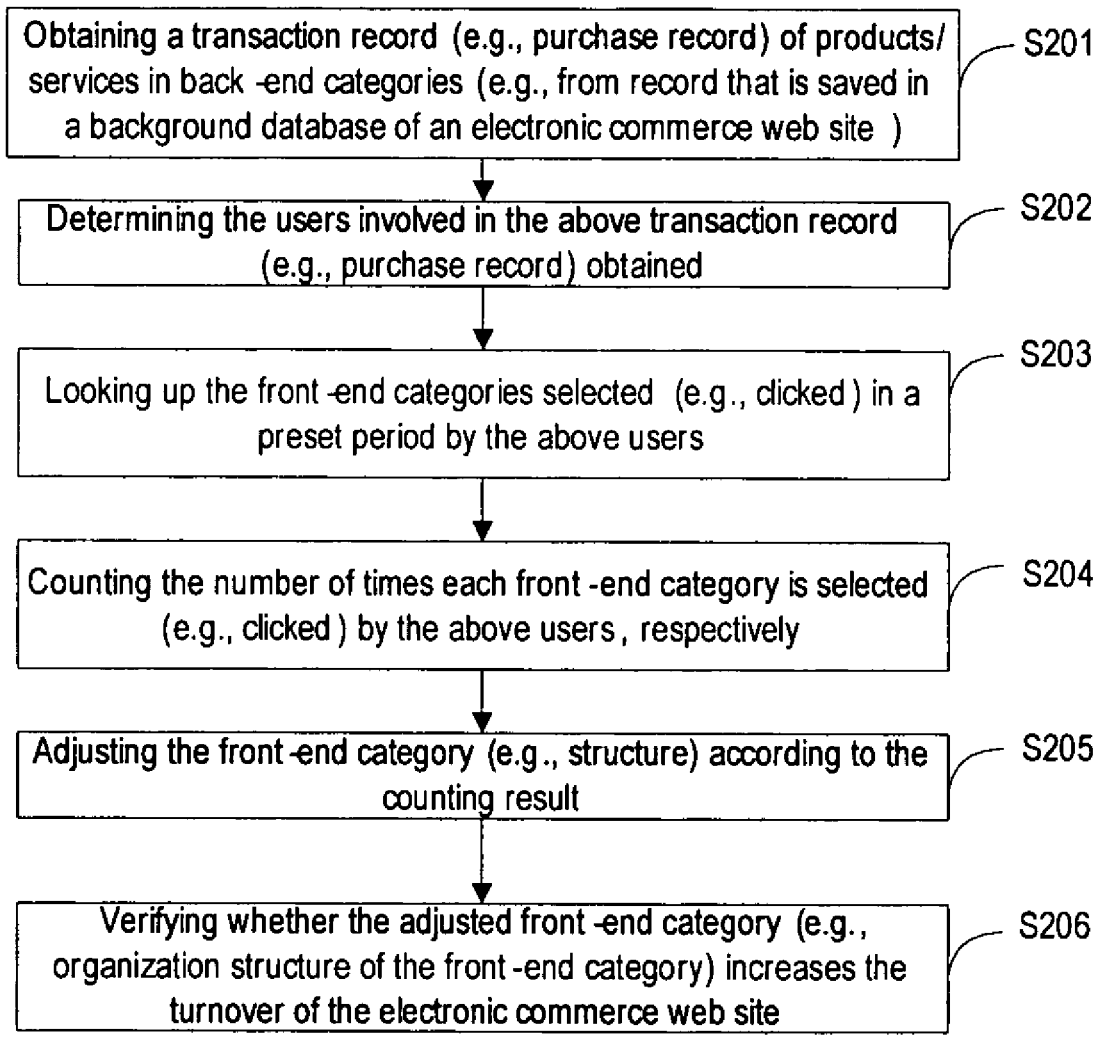
FIG. 4 is a flow chart illustrating a specific example of a process for adjusting the front-end category of an electronic commerce website.

FIG. 4 is a flow chart illustrating a specific example of a process for adjusting the front-end category of an electronic commerce website. The process includes:

At S201, obtaining a transaction record. In this case the transaction record is a purchase record of products in a set of one or more back-end categories that is saved from a back-end database of an electronic commerce website, with the following data:

back-end category: domestic mobile phone; purchaser: user 3; user ID: ID3;
back-end category: Nokia mobile phone; purchaser: user 2; user ID: ID2;
back-end category: Nokia mobile phone; purchaser: user 4; user ID: ID4;
back-end category: Nokia mobile phone; purchaser: user 1; user ID: ID1;
back-end category: Sony camera; purchaser: user 8; user ID: ID8;
back-end category: Sony camera; purchaser: user 7; user ID: ID7;
back-end category: Samsung camera; purchaser: user 5; user ID: ID5;
back-end category: Samsung camera; purchaser: user 6; user ID: ID6;
back-end category: Samsung camera; purchaser: user 9; user ID: ID9;
. . .

At S202: determining the users who purchased the products in the back-end categories in the above purchase record obtained, as follows:

user who purchased products in back-end category "domestic mobile phone": user 3;
users who purchased products in back-end category "Nokia mobile phone": user 1, user 2 and user 4;
users who purchased products in back-end category "Sony camera": user 7 and user 8;
users who purchased products in back-end category "Samsung camera": user 5, user 6 and user 9;
. . .

At S203: looking up the front-end categories selected in the preset period by the above users.

For example, the first mode provided by the above step S103 of FIG. 3 is employed as follows: determining the front-end categories selected in the preset period by the above users determined, by matching the selection event record of all users on each front-end category in the preset period that is recorded by the front-end log system via the user ID.

i) The selection event record of all users on each front-end category in the preset period that is obtained from the log system of the electronic commerce website is as follows:

user IDs that selected front-end category "hot mobile phone": ID3, ID4, . . . , IDm;
user IDs that selected front-end category "mobile phone in promotion": ID1, ID2, ID3, ID4, . . . , IDn;
user IDs that selected front-end category "hot camera": ID5, ID7, ID8, . . . , IDk;
user IDs that selected front-end category "camera in promotion": ID5, ID6, ID8, ID9, . . . , IDj;
. . .

ii) Determining user IDs purchasing products in each back-end category, as follows:

user ID corresponding to the user purchasing the products in back-end category "domestic mobile phone": ID3;
user IDs corresponding to the users purchasing the products in back-end category "Nokia mobile phone": ID1, ID2 and ID4;
user IDs corresponding to the users purchasing the products in back-end category "Sony camera": ID7 and ID8;
user IDs corresponding to the users purchasing the products in back-end category "Samsung camera": ID 5, ID6 and ID9;
. . .

iii) Determining the front-end categories selected in the preset period by the users that purchase products in each back-end category according to the user IDs determined and the selection event record obtained, specifically as follows:

determining according to ID1 that user 1 purchased a product in back-end category "Nokia mobile phone" and selected front-end category "mobile phone in promotion" in the preset period;
determining according to ID2 that user 2 purchased a product in back-end category "Nokia mobile phone" and selected front-end category "mobile phone in promotion" in the preset period;
determining according to ID3 that user 3 purchased a product in back-end category "domestic mobile phone" and selected front-end categories "mobile phone in promotion" and "hot mobile phone" in the preset period;

determining according to ID4 that user 4 purchased a product in back-end category "Nokia mobile phone" and selected front-end categories "mobile phone in promotion" and "hot mobile phone" in the preset period;

determining according to ID5 that user 5 purchased a product in back-end category "Samsung camera" and selected front-end categories "camera in promotion" and "hot camera" in the preset period;

determining according to ID6 that user 6 purchased a product in back-end category "Samsung camera" and selected front-end category "camera in promotion" in the preset period;

determining according to ID7 that user 7 purchased a product in back-end category "Sony camera" and selected front-end category "hot camera" in the preset period;

determining according to ID8 that user 8 purchased a product in back-end category "Sony camera" and selected front-end categories "camera in promotion" and "hot camera" in the preset period;

determining according to ID9 that user 9 purchased a product in back-end category "Samsung camera" and selected front-end category "camera in promotion" in the preset period;

. . .

In another example, the second mode provided by the above step S103 is employed as follows: directly determining the front-end categories selected by the user in the preset period according to the access path of the user that is recorded in the address bar of the electronic commerce website, when the user purchases a product in the back-end category, specifically, for example:

user 1 browses front-end category "mobile phone in promotion" when purchasing a product in back-end category "Nokia mobile phone";

user 2 browses front-end category "mobile phone in promotion" when purchasing a product in back-end category "Nokia mobile phone";

user 3 browses front-end categories "mobile phone in promotion" and "hot mobile phone" when purchasing a product in back-end category "domestic mobile phone";

user 4 browses front-end categories "mobile phone in promotion" and "hot mobile phone" when purchasing a product in back-end category "Nokia mobile phone";

user 5 browses front-end categories "camera in promotion" and "hot camera" when purchasing a product in back-end category "Samsung camera";

user 6 browses front-end category "camera in promotion" when purchasing a product in back-end category "Samsung camera";

user 7 browses front-end category "hot camera" when purchasing a product in back-end category "Sony camera";

user 8 browses front-end categories "camera in promotion" and "hot camera" when purchasing a product in back-end category "Sony camera";

user 9 browses front-end category "camera in promotion" when purchasing a product in back-end category "Samsung camera";

. . .

At S204: determine the number of times each front-end category was selected by the above users determined respectively, as follows:

the number of times front-end category "hot mobile phone" is selected by the users that purchase products in each back-end category is 2;

the number of times front-end category "mobile phone in promotion" is selected by the users that purchase products in each back-end category is 4;

the number of times front-end category "hot camera" is selected by the users that purchase products in each back-end category is 3;

the number of times front-end category "camera in promotion" is selected by the users that purchase products in each back-end category is 4;

. . .

At S205: adjusting the front-end category structure according to the transaction record information and the result from S204.

For example, because the number of selections on "mobile phone in promotion" and "camera in promotion" is high, back-end category "Samsung mobile phone" is added into front-end category "mobile phone in promotion", and back-end category "Kodak camera" is added into front-end category "camera in promotion", to increase the product turnover thereof; that is, a mapping relation between back-end category "Samsung mobile phone" and front-end category "mobile phone in promotion" and a mapping relation between back-end category "Kodak camera" and front-end category "camera in promotion" are established respectively.

Process S206: counting the total turnover of products in the electronic commerce website in the next preset period, and verifying whether the reorganized front-end category structure exhibits improved effects and whether the turnover is increased.

Figure 5:
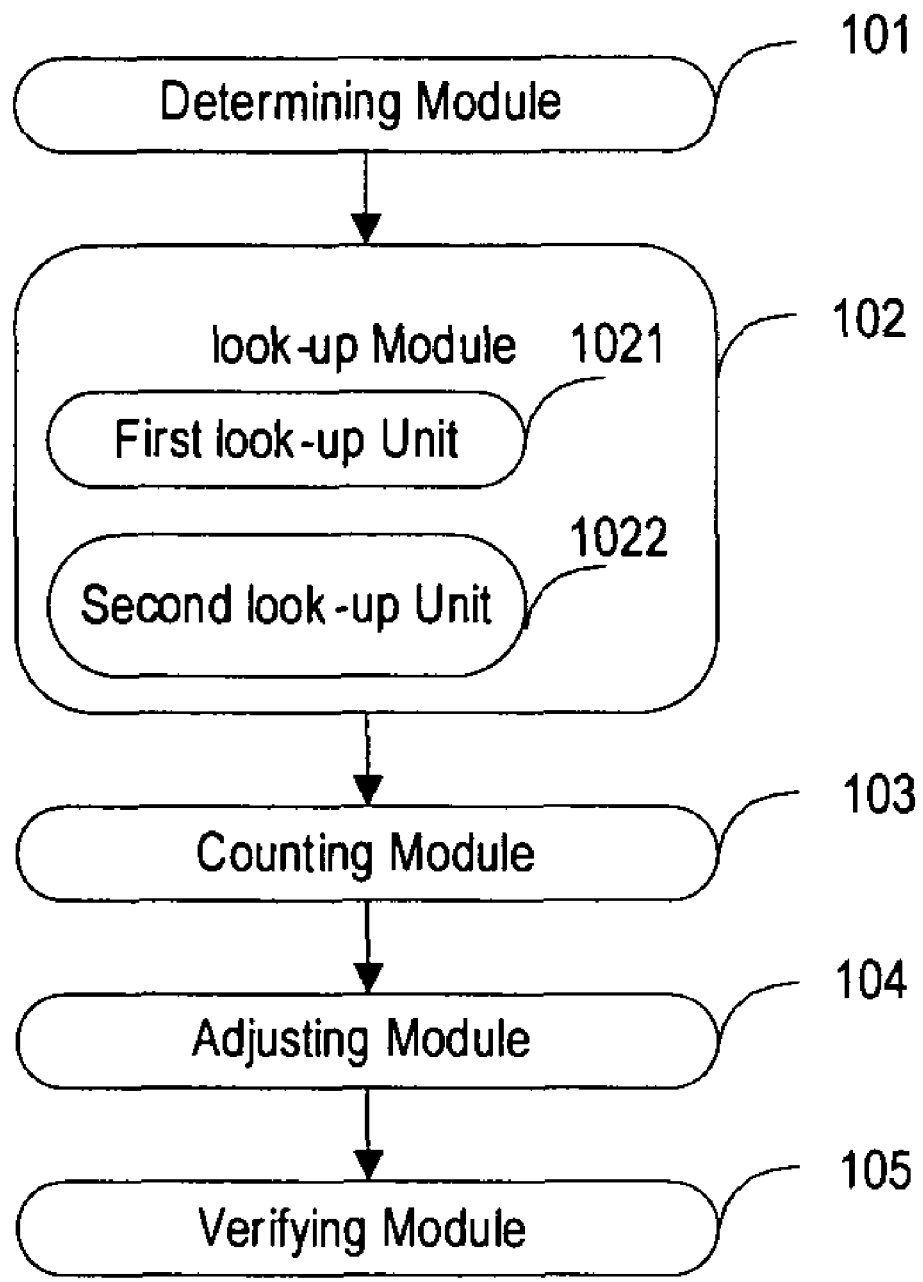
FIG. 5 is a structural representation of an embodiment of a device configured to adjust the front-end category of an electronic commerce website.

A device for adjusting the front-end category of an electronic commerce website may be constructed according to the above method of the invention for adjusting the front-end category of an electronic commerce website. The structure of the device is as shown in FIG. 5, which includes: a determining module 101, a look-up module 102, a counting module 103 and an adjusting module 104. The modules can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules may be implemented on a single device or distributed across multiple devices. The functions of the modules may be merged into one another or further split into multiple sub-modules.

The determining module 101 is configured to obtain transaction records of each back-end category in a preset period that is recorded in a back-end database of the electronic commerce website and determine the users that purchase the products in each back-end category.

The look-up module 102 is configured to look up the front-end categories selected in the preset period by the users determined by the determining module 101.

Preferably, the look-up module may further include: a first look-up unit 1021 and a second look-up unit 1022.

The first look-up unit 1021 is configured to determine the user IDs of the users that purchase products in each back-end category according to the transaction record obtained by the determining module 101, obtain the selection event record of all users on each front-end category in the preset period that is recorded by the log system of the electronic commerce website, and then determine the front-end categories selected in a preset period by the users that purchase products in each back-end category according to the selection event record obtained and the user ID determined.

The second look-up unit 1022 is configured to determine the front-end categories selected by the users according to user access paths and directly determine the front-end categories selected by the users in the preset period, when the users purchase products in the back-end category.

The counting module 103 is configured to respectively count the number of times each front-end category is selected by the users purchasing the products in each back-end category that are determined.

The adjusting module 104 is configured to adjust the front-end category structure according to the counting result.

The above device for adjusting the front-end category of an electronic commerce website further includes: a verifying module 105, which is configured to count the total turnover of products in the electronic commerce website in the next preset period, and verify the adjusted front-end category structure via the total turnover counted.

With the method and device for adjusting the front-end category of an electronic commerce website provided by the embodiments of the invention, an association between the selection event of front-end categories and the transaction event of products in the back-end categories is established via user ID or the access path of a user when purchasing, and the influence event of the front-end category on the transaction of products in the back-end categories is obtained, thus a decision support may be provided to an electronic commerce website for scientifically and reasonably organizing the front-end category relation; by adjusting the front-end category according to the practical counting result, a more optimized organization structure of the front-end category may be obtained, thereby users may be better guided to browse various products exhibited on the website, a good product exhibition effect may be obtained, and the product turnover of the website may be increased.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electronic commerce system, comprising:
one or more processors configured to:
obtain transaction information pertaining to a set of back-end categories, the transaction information includes user information of users in the system who completed transactions in the set of back-end categories during a preset period, and wherein the transaction information includes information indicating that a product has been purchased;
determine, based on the user information, a set of front-end categories that were selected by the users in the system during the preset period;
determine a number of times a front-end category in the set of front-end categories was selected by the users in the system during the preset period; and
adjust the front-end category according to the transaction information and the number of times the front-end category was selected during the preset period; and a memory coupled to at least one of the one or more processors, configured to provide the processor with instructions.

2. The system of claim 1, wherein the one or more processors are configured to determine the set of front-end categories by:
determining user identifiers of the users according to the transaction record;
obtaining selection event records of users who selected the front-end category during the preset period; and
determining the front-end categories selected by the users during the preset period according to the user identifiers and the selection event records.

3. The system of claim 1, wherein the one or more processors are configured to determine the set of front-end categories by recording a front-end category that is selected by a user when the user completes a transaction of a product in the back-end category.

4. The system of claim 3, wherein recording the front-end category includes determining the front-end category according to the access path of the user.

5. The system of claim 1, wherein each front-end category corresponds to one or more back-end categories.

6. The system of claim 1, wherein each back-end category corresponds to one or more front-end categories.

7. The system of claim 1, wherein adjusting the front-end category includes associating an additional related back-end category with the front-end category in the event that the number of times the front-end category was selected during the preset period is high.

8. The system of claim 1, wherein adjusting the front-end category includes removing association of a back-end category with the front-end category in the event that the number of times the front-end category was selected during the preset period is low.

9. The system of claim 1, further comprising adding an additional related front-end category in the event that the number of times the front-end category was selected during the preset period is high.

10. The system of claim 1, wherein the transaction information includes information indicating that a product has been viewed.

11. The system of claim 1, wherein the transaction information includes information indicating that a product has been saved.

12. A method of managing categories in an electronic commerce system, comprising:
obtaining transaction information pertaining to a set of back-end categories, the transaction information includes user information of users in the system who completed transactions in the set of back-end categories during a preset period, and wherein the transaction information includes information indicating that a product has been purchased;
determining, based on the user information, a set of front-end categories that were selected by the users in the system during the preset period;
determining, using a processor, a number of times a front-end category in the set of front-end categories was selected by the users in the system during the preset period; and
adjusting the front-end category according to the transaction information and the number of times the front-end category was selected during the preset period.

13. The method of claim 12, wherein determining the set of front-end categories includes:
- determining user identifiers of the users according to the transaction record;
- obtaining selection event records of users who selected the front-end category during the preset period; and
- determining the front-end categories selected by the users during the preset period according to the user identifiers and the selection event records.

14. The method of claim 12, wherein determining the set of front-end categories includes recording a front-end category that is selected by a user when the user completes a transaction of a product in the back-end category.

15. The method of claim 14, wherein recording the front-end category includes determining the front-end category according to the access path of the user.

16. The method of claim 12, wherein each front-end category corresponds to one or more back-end categories.

17. The method of claim 12, wherein each back-end category corresponds to one or more front-end categories.

18. The method of claim 12, wherein adjusting the front-end category includes associating an additional related back-end category with the front-end category in the event that the number of times the front-end category was selected during the preset period is high.

19. The method of claim 12, wherein adjusting the front-end category includes removing association of a back-end category with the front-end category in the event that the number of times the front-end category was selected during the preset period is low.

20. The method of claim 12, further comprising adding an additional related front-end category in the event that the number of times the front-end category was selected during the preset period is high.

21. The method of claim 12, wherein the transaction information includes information indicating that a product has been viewed.

22. The method of claim 12, wherein the transaction information includes information indicating that a product has been saved.

23. A computer program product for delivering content, the computer program product being embodied in a computer readable storage medium and comprising computer instructions for:
- obtaining transaction information pertaining to a set of back-end categories, the transaction information includes user information of users in the system who completed transactions in the set of back-end categories during a preset period, and wherein the transaction information includes information indicating that a product has been purchased;
- determining, based on the user information, a set of front-end categories that were selected by the users in the system during the preset period;
- determining a number of times a front-end category in the set of front-end categories was selected by the users in the system during the preset period; and
- adjusting the front-end category according to the transaction information and the number of times the front-end category was selected during the preset period.

* * * * *